United States Patent [19]

Seider

[11] Patent Number: 4,803,387
[45] Date of Patent: Feb. 7, 1989

[54] ELECTRIC DRIVE MOTOR

[75] Inventor: Gene J. Seider, Bloomington, Minn.

[73] Assignee: FMC Corporation, Chicago, Ill.

[21] Appl. No.: 67,746

[22] Filed: Jun. 29, 1987

[51] Int. Cl.[4] ............................................. H02K 41/06
[52] U.S. Cl. ....................................... 310/12; 318/135
[58] Field of Search ...................... 310/12, 14; 318/135

[56] References Cited

U.S. PATENT DOCUMENTS

| | | | |
|---|---|---|---|
| 464,063 | 12/1891 | Collom | 310/14 |
| 4,074,160 | 2/1978 | Broadway | 310/166 |

FOREIGN PATENT DOCUMENTS

| | | | |
|---|---|---|---|
| 7424275 | 2/1976 | France | 310/12 |
| 0002386 | 1/1980 | Japan | 310/12 |

*Primary Examiner*—Patrick R. Salce
*Assistant Examiner*—Judson H. Jones
*Attorney, Agent, or Firm*—Ronald C. Kamp; Richard B. Megley; Douglas W. Rudy

[57] ABSTRACT

A linear belt motor, especially useful for driving a land vehicle, having a pair of sprockets with a belt trained over them. Permanent magnets are attached to the belt and u-shaped stator poles are positioned astraddle the belt between the sprockets. Windings on the stator poles are connected with a control circuit means for independently determining the speed and torque output of the motor and its direction of rotation. Each stator pole has large radius faces and a width which is substantially twice that of the permanent magnets. A second embodiment employs a second belt also provided with permanent magnets and u-shaped stator poles having their windings also energized by the control circuit means.

13 Claims, 4 Drawing Sheets

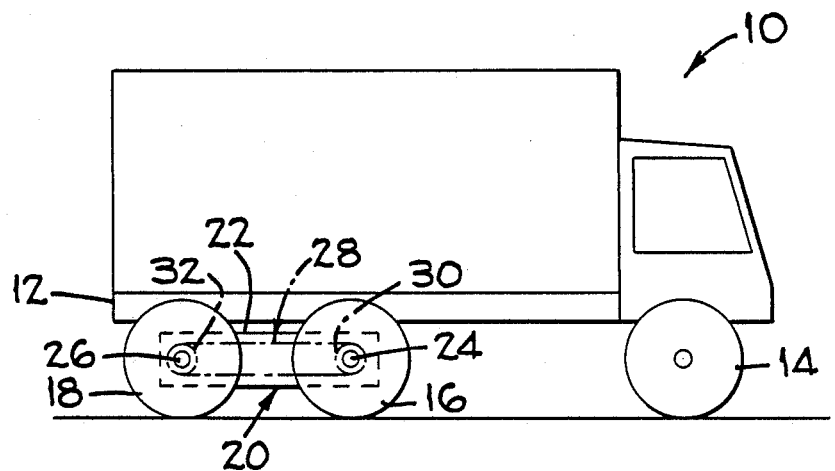
FIG_1
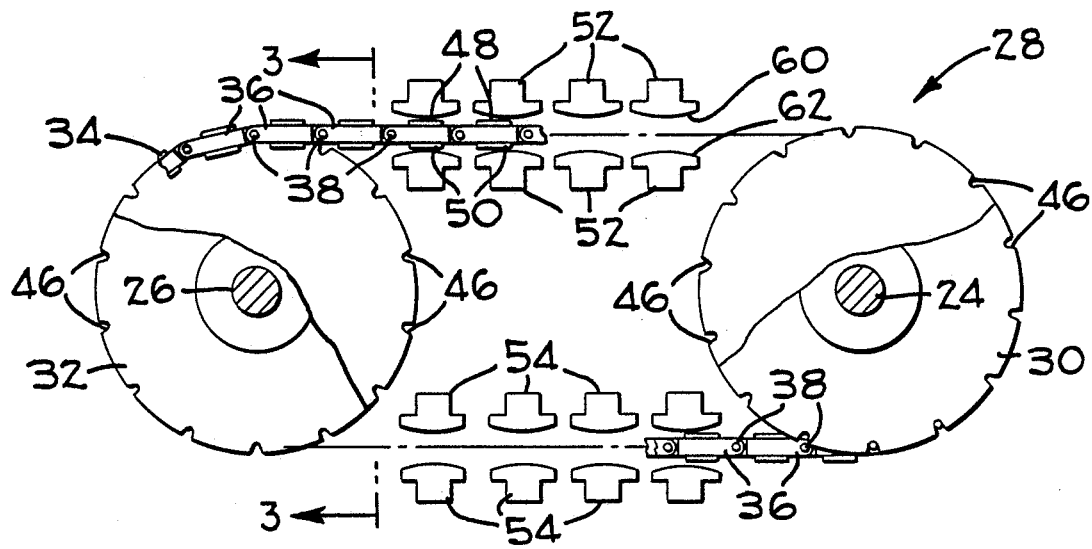
FIG_2
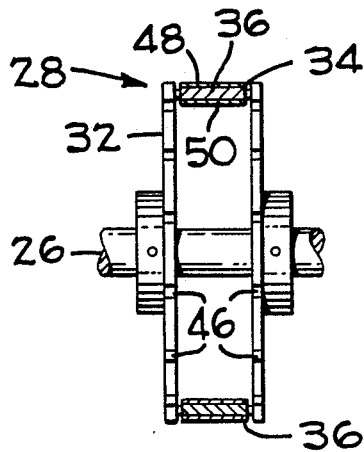
FIG_3
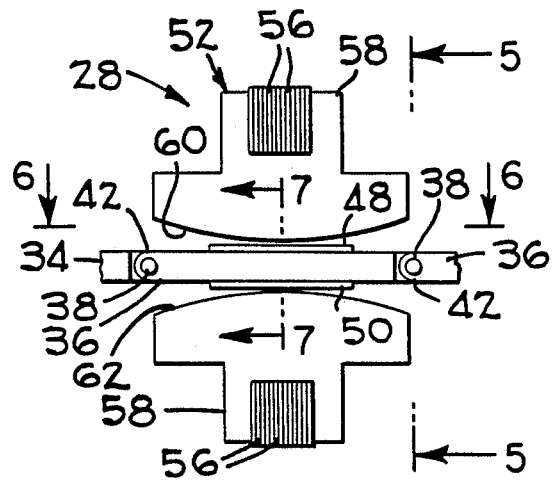
FIG_4

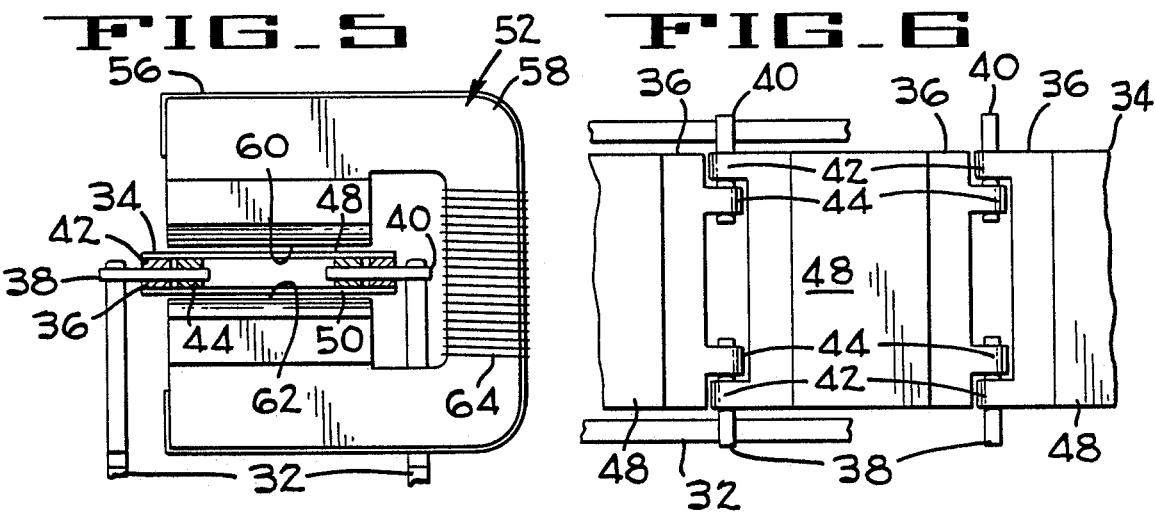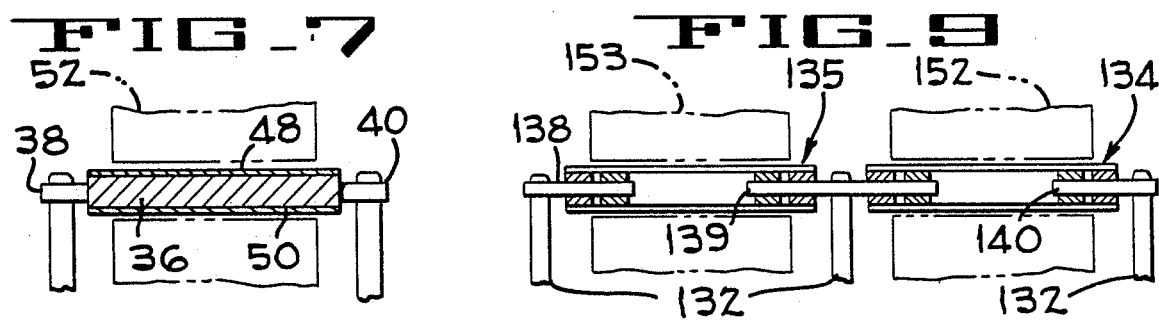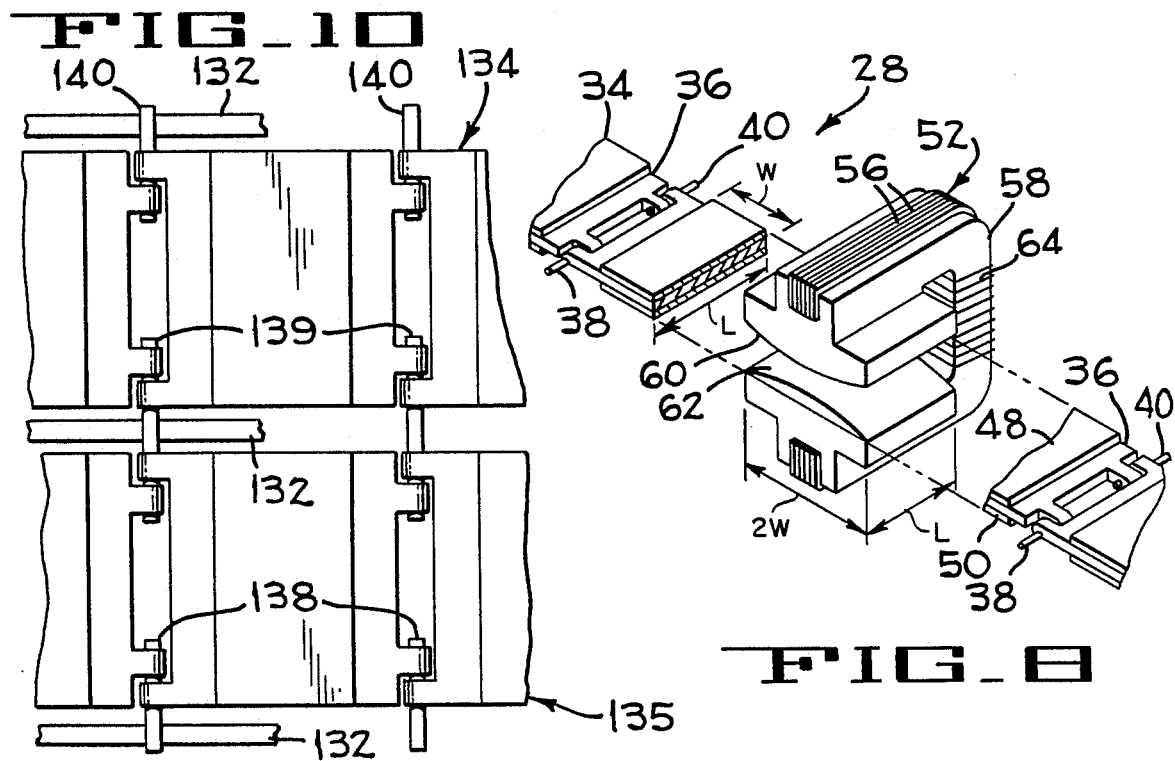

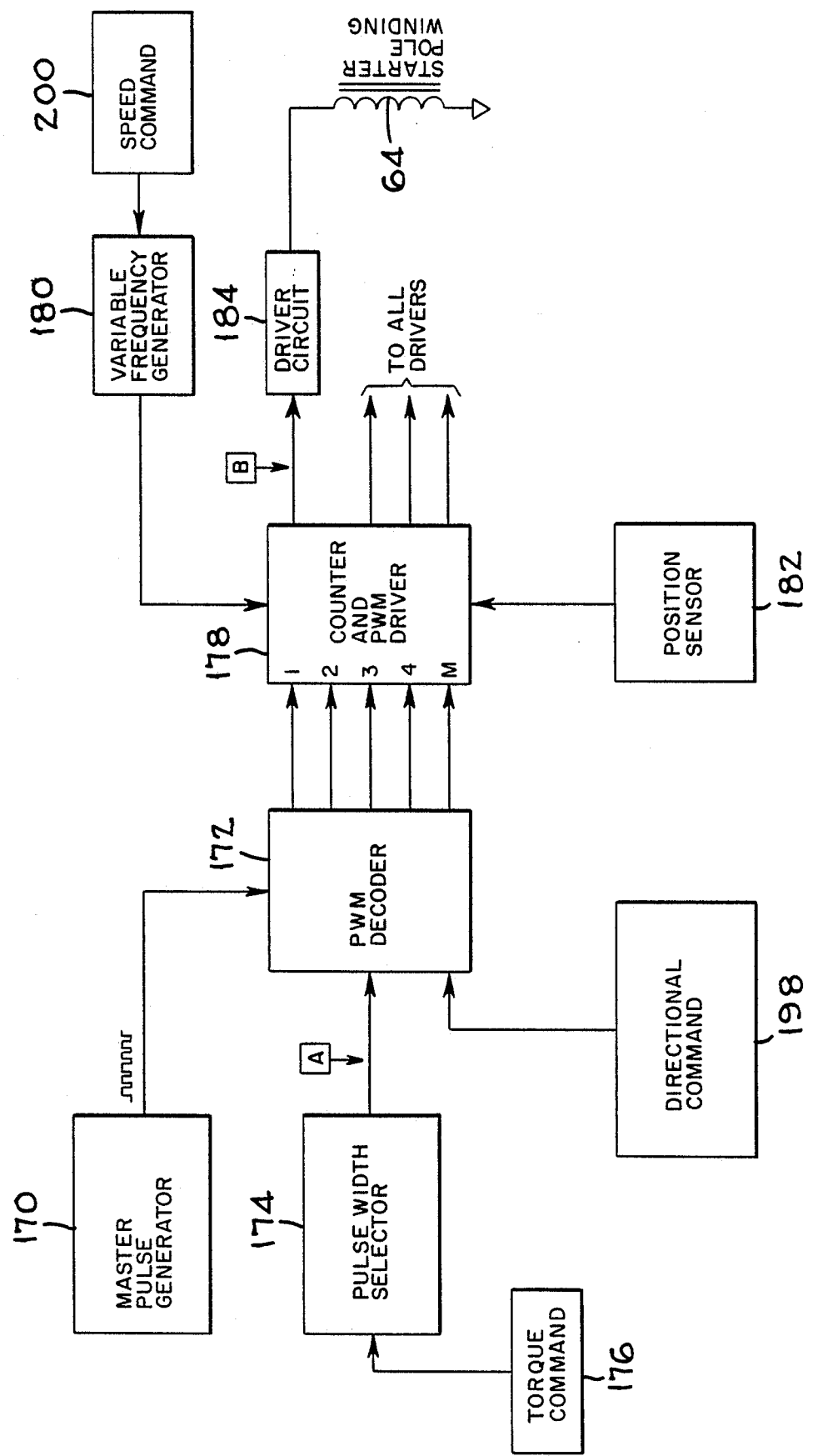
FIG_11

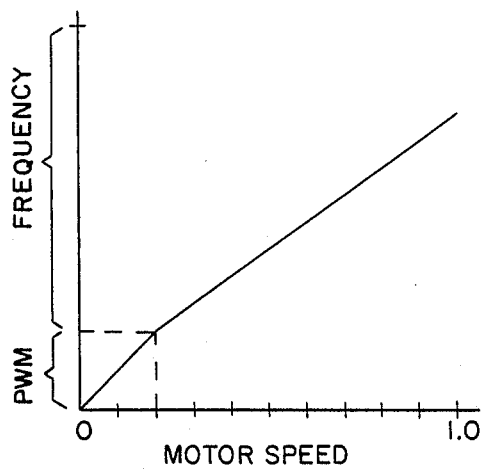
FIG_12
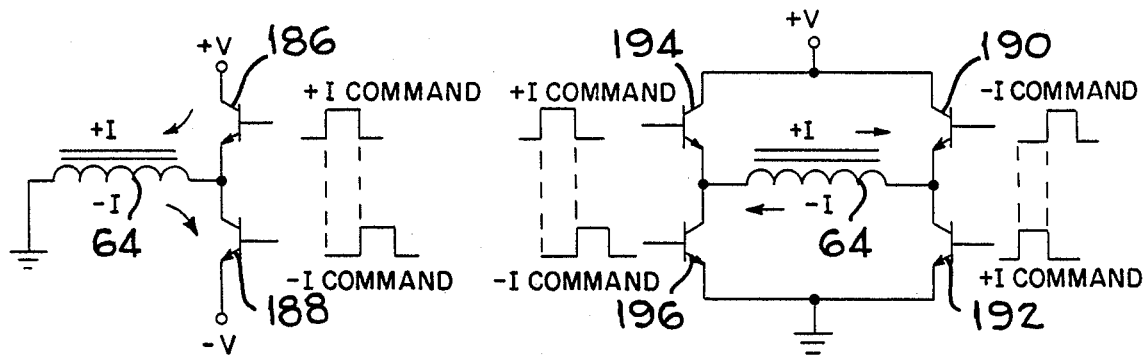
FIG_13  FIG_14
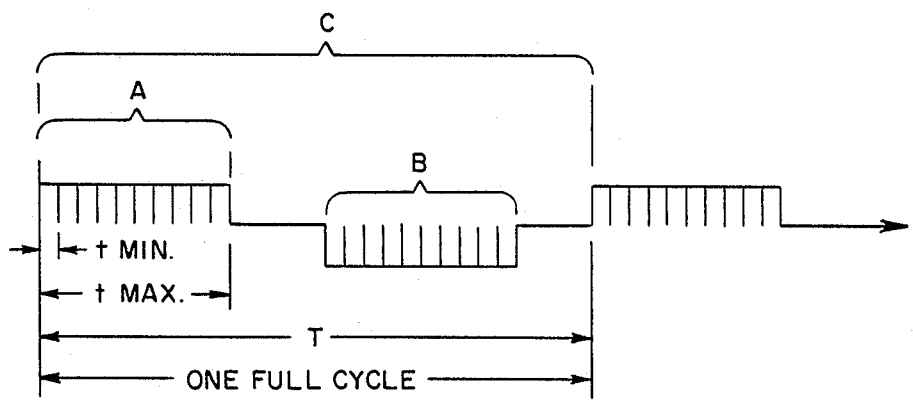
FIG_15

ELECTRIC DRIVE MOTOR

This invention relates to linear motors, generally, and more particularly to such motors that provide a rotary output.

The present invention provides a linear belt motor with high torque output at relatively low speed and with improved power capability, and thus enhanced horsepower density. The present invention also permits greater flexibility in terms of form and shape, and, because of the inherent lower output speeds, obviates the need for speed reducers and their concommitent cost, weight and space requirements.

Preferred embodiments of the present invention are described herein and illustrated in the drawings, wherein:

FIG. 1 is a side elevational view of a vehicle incorporating a linear belt motor according to the present invention;

FIG. 2 is a more detailed view, in side elevation, of the motor shown in FIG. 1;

FIG. 3 is a sectional view taken on line 3—3 of FIG. 2;

FIG. 4 is a detail view of one of the stator poles and a portion of the belt shown in FIG. 2;

FIG. 5 is a cross sectional view taken on line 5—5 of FIG. 4;

FIG. 6 is a cross sectional view, with portions broken away, taken on line 6—6 of FIG. 4;

FIG. 7 is a partial cross sectional view taken on line 7—7 of FIG. 4;

FIG. 8 is an isometric view, with portions broken away, of a portion of the motor shown in FIG. 2;

FIG. 9 is a cross sectional view, similar to FIG. 7 of another embodiment of the present invention;

FIG. 10 is a top plan view of the embodiment shown in FIG. 9;

FIG. 11 is a schematic block diagram of a control circuit which may be used with the motor of FIG. 2;

FIG. 12 is a graph illustrating the relationship between motor speed and changes in PWM and fequency;

FIG. 13 is an embodiment of a driver circuit useable in the circuit of FIG. 11;

FIG. 14 is another embodiment of a driver circuit useable in the circuit of FIG. 11;

FIG. 15 is a diagram of the output from the counter and PWM Driver shown in FIG. 11.

Referring to FIG. 1, there is shown a vehicle, indicated generally at 10, having a frame 12 supported at the front by a pair of steerable wheels, one of which is shown at 14, and at the rear by two pair of drive wheels; one of each pair being shown at 16 and 18 respectively. A pair of belt motor units, one of which is indicated generally at 20, is attached to the frame 12. The unit 20 includes an enclosed casing 22 in which a pair of shafts 24 and 26 are rotatably mounted, which shafts project from the casing 22 and directly mount the drive wheels 16 and 18 respectively on the right side of the vehicle. It is to be understood that the other of the belt motor units would be a mirror image of the unit 20 with comparable shafts projecting from the left side of its casing and mounting the drive wheels on the left side. This arrangement permits the left and right drive wheels to operate at different speeds when the vehicle is negotiating a turn.

As shown in FIG. 1, a linear belt motor 28 is mounted in the casing 22 and includes sprockets 30 and 32 affixed to shafts 24 and 26 respectively. A belt 34 is trained over the sprockets 30 and 32 and is composed of a plurality of identical, rigid links 36 rotatably interconnected by pins 38 and 40 which extend through openings in laterally offset ears 42 and 44 formed on adjacent ends of the links 36 and project outward to engage appropriately spaced recesses 46 formed on the periphery of the sprockets 30 and 32. Each link 36 is made of a non-magnetic material, such as stainless steel, for example, and has a permanent magnet 48 and 50 secured to both its outer and inner surfaces. The permanent magnets may be made of any suitable type, such as samarium cobalt, for example, with all magnets having their poles oriented transverse to the belt and with the magnets on each link 36 having opposite poles adjacent the link. For example, each link 36 in the belt 34 has the outer magnet 48 with its south pole adjacent the outer surface of the link and the inner magnet 50 with its north pole adjacent the inner surface of the link. The permanent magnets 48 and 50 are all of the same size, oriented with the same polarity and secured at the same location on the links.

A plurality of U-shaped stator poles 52 are secured, such as by attachment to the walls of the casing 22, along the upper run of the belt 34 and an identical number of similar poles 54 are secured along the lower run of the belt 34. Each stator pole is composed of laminated U-shaped elements 56 having good magnetic properties stacked in a U-shaped pole frame 58 having opposing pole faces 60 and 62. The pole face is a large radius surface which is twice as long as the width W of the permanent magnet. (See FIG. 8) The shape and size of the pole faces assure an effective distribution of magnetic force on the permanent magnets when an electric current is passed through the coil 64 wound on each of the stator poles 52 and 54. The belt 34, with the permanent magnets attached thereto, passes between the opposing faces of the stator poles 52 and 54. Forces of attraction and repulsion between the permanent magnets and electromagnetic forces of the stator poles are transmitted to the belt 34 and cause the sprockets 30 and 32 to be rotated, thereby driving shafts 24 and 26.

The power that can be developed by the linear belt motor is a function of the number of stator poles and magnet length L. The pole face length L is substantially equal to magnet length L. (See FIG. 8) FIGS. 9 and 10 illustrate an embodiment in which the power output can be substantially increased without increasing the overall length of the casing and with only a relatively small increase in the casing width. In this embodiment, a pair of belts 134 and 135 each of which are similar to belt 34 are pinned together by pins 137, 138, 139 and 140 and are trained over sprockets, one set of which is shown at 132, similar to sprockets 32 and 34. The pins 138, 139, and 140, which pivotally interconnect the individual links of the belts 134 and 135, engage recesses formed in the sprockets and transmit the driving forces to the shafts to which the sprockets are attached. A plurality of stator poles 152 and 153, which are similar to stator poles 52 and 54, are secured to opposite side walls of the casing and are positioned so that the open ends of their U-shaped frames are adjacent each other and the belts 134 and 135 pass therebetween. Holding all other components constant, the power output from the dual belt arrangement of FIGS. 9 and 10 would be twice that of the embodiment in FIGS. 2-8. Control of the FIG. 9 and 10 embodiment would be substantially the same as for the first mentioned except for the provision of actuating both a left and right stator pole.

Operation of the linear belt motor involves passing a direct current through the coil or winding of each stator pole in a direction to create a magnetic field to attract the permanent magnets positioned just entering the stator pole field with respect to the desired direction of rotation. This magnetic field will first attract the permanent magnets and then repell them since the polarity of the stator pole magnets changes as the permanent magnets pass the stators. By positioning the permanent magnets so that the spacing therebetween is less than the space between adjacent stator poles and by providing at least two sets of stator poles, there will always be a net force to initiate rotation of the belt.

In order to control the direction of rotation, the start-up torque, the speed and the power output, it is necessary to control when the flow of direct current begins and the length of time that the current flows. A schematic block diagram of a control circuit capable of controlling a linear belt motor is shown in FIG. 11. A master pulse generator 170 produces a symetrical square wave which is fed to a pulse width modulation decoder 172. A selector 174, which responds to the input from a torque control 176, selects a number of pulses between zero and n, such as, for example, 0 to 6, which is also fed to the decoder 172. The outputs from the decoder 172, one for each of the stator pole windings, are fed to a counter and PWM driver 178. A variable frequency generator or oscillator 180 is also fed to the counter 178. The output from the counter 178 is a duty cycle and is illustrated in FIG. 15. The maximum pulse width, t max, is determined by the selector 174 and is composed of a preselected number of cycles, t min. The full cycle is determined by the oscillator 180. The timing of the duty cycle, i.e., when it should be initiated, is determined by a position sensor 182 which senses the position of the permanent magnets relative to a given one of the stator pole faces. This sensor may be mechanical, optical or electronic. The outputs from the counter 178 are to individual driver circuits 184 each of which energizes its associated stator pole winding 64. A simple form of driver circuit 184 is shown in FIG. 13 wherein a transistor 186 has its collector connected to +V and its emitter connected to the collector of a second transistor 188. The stator pole winding 64 is connected between the juncture of the emitter of the first transistor 186 with the collector of the second transistor 188 and ground. When the transistor 186 is switched on by the application of the "A" portion of the cycle to its base, current flows from +V to ground through the winding 64, and the associated pole faces are provided with a resultant polarity. When the transistor 188 is switched on by application of the "B" portion of the full cycle to its base, current flows through the winding 64 from ground to −V, and the associated pole faces are provided with an opposite polarity. While the driver circuit of FIG. 13 requires only two transistors, it does require both positive and negative sources of voltage. The driver circuit of FIG. 14 has the advantage of requiring only one voltage source. In the FIG. 14 circuit, transistors 190 and 192 are connected in series between +V and ground in parallel with transistors 194 and 196. The winding 64 is connected between the interconnection of transistors 190 and 192 and the interconnection of transistors 194 and 196. The transistors 192 and 194 are switched on by "A" portion of the full cycle and current flows through the winding 64 for one magnetic polarity and the other polarity is achieved when the transistors 190 and 196 are switched on during the "B" portion of the full cycle.

The control circuit shown in FIG. 11 also includes a directional command 198 which effectively reverses the phase of the PWM decoder 172 with respect to the master pulse generator 170. The resultant is a change in magnetic polarity of the stator poles. Speed command 200 controls the frequency of oscillator 180 and hence the length of one full cycle, "C". Increasing the frequency output from oscillator 180 will increase the speed of the linear belt motor. Similarly, decreasing the frequency from the oscillator 180 decreases the speed of the motor. Torque command 176 determines the torque output by setting that portion of the full cycle during which electromagnetic force is applied to the stator poles. Since the speed, determined by the setting of speed command 200, and motor torque, determined by torque command 176, are individually determined, it will appreciated that independent control of speed and torque, and thus motor horsepower, is provided by the control of FIG. 11.

The windings 64 will, of course, generate heat, as will the transistors in the driver circuits 184. There is also a need for lubrication for the moving parts of the linear belt motor. It is convenient, therefore, to position the driver circuit within the casing 22 and to provide a cooling and lubricating liquid within the casing. Heat transferred to the liquid is transferred by conduction through the walls of the casing 22 and through convection to the ambient air, which is enhanced by the motion of the vehicle 10.

What is claimed is:

1. A linear belt motor comprising:
   a pair of aligned and rotatable sprockets:
   a plurality of non-magnetic rigid links connected to form a belt;
   said belt trained over said sprockets;
   a pair of permanent magnets affixed to each of said links with opposite magnetic poles thereof adjacent the associated link;
   a plurality of u-shaped stator poles positioned between said sprockets and straddling said belt;
   each of said stator poles having a pair of pole faces of a large radius and a length substantially twice the width of said magnets;
   a coil wound on each stator pole;
   position sensing means to determine the position of said magnets relative to said stator poles; and
   control circuit means responsive to said position sensing means to sequentially energize each of said coils in order to attract and repel the permanent magnets adjacent each of said stator poles.

2. The invention according to claim 1 wherein said control circuit means comprises:
   a master pulse generator;
   a pulse width selector;
   a pulse width decoder connected to receive the output from said generator and selector and to provide an output for each coil;
   a counter and pulse width modulator driver connected to receive the outputs from said decoder and from said position sensing means;
   a variable frequency generator connected to said counter; and
   driver circuit means connecting such coil to said counter.

3. The invention according to claim 2 wherein said control circuit means includes a directional command connected to said decoder.

4. The invention according to claim 2 wherein said control circuit means includes a torque command connected to said selector to determined the duration of current to said coils.

5. The invention according to claim 2 wherein said control circuit means includes a speed command connected to said variable frequency generator to control the speed of said motor.

6. The invention according to claim 2 wherein said control circuit means includes a torque command input to said pulse width selector and a speed command input to said variable speed generator whereby independent control of motor speed and torque is permitted.

7. The invention according to claim 2 wherein said u-shaped stator poles are positioned along both the upper and lower runs of said belt.

8. The invention according to claim 2 and further comprising:
   a casing enclosing said motor; and
   a lubricant at least partially filling said casing whereby said belt will be lubricated and heat generated by said coils may be dissipated.

9. The invention according to claim 2 wherein the spacing between adjacent magnets is less than the spacing between adjacent stator poles.

10. A drive means for a vehicle having at least one traction wheel to be driven comprising:
    a substantially enclosed casing supported forms said vehicle;
    a pair of shafts rotatably mounted in said casing;
    a pair of sprocket wheels affixed to each shaft;
    a plurality of non-magnetic rigid links pivotally connected to form an endless belt;
    said belt being trained around and drivingly engaging said pair of sprocket wheels;
    a permanent magnetic attachment to each side of each of said links and having opposite poles adjacent the associated link;
    a plurality of u-shaped stator poles attached to said casing and positioned astraddle said belt and between said pair of sprockets;
    each of stator poles having a pair of pole faces of large radius and a length substantially twice the width of said magnets;
    a coil wound on each stator pole;
    position sensing means to determined the position of said magnets relative to said stator poles; and
    control circuit means responsive to said position sensing means to sequentially energize each of said coils in order to drive said traction wheel.

11. The invention according to claim 10 wherein said control circuit means includes means for independently determining the speed and torque output of said drive means.

12. The invention according to claim 10 and further comprising:
    a pair of third sprockets, one associated with each pair of sprockets and attached to one of said shafts;
    a second belt having permanent magnets trained over and engaging said third sprocket;
    a second plurality of u-shaped stator poles attached to said casing and positioned between said sprockets and straddling said belt; and
    windings on said second stator poles connected to said control circuit means.

13. The invention according to claim 10 wherein said casing is at least partially filled with a liquid lubricant.

* * * * *